June 18, 1935. C. W. PARKER 2,005,556
COUPLING MEANS FOR LUBRICATING SYSTEMS
Original Filed Nov. 21, 1923 3 Sheets-Sheet 1
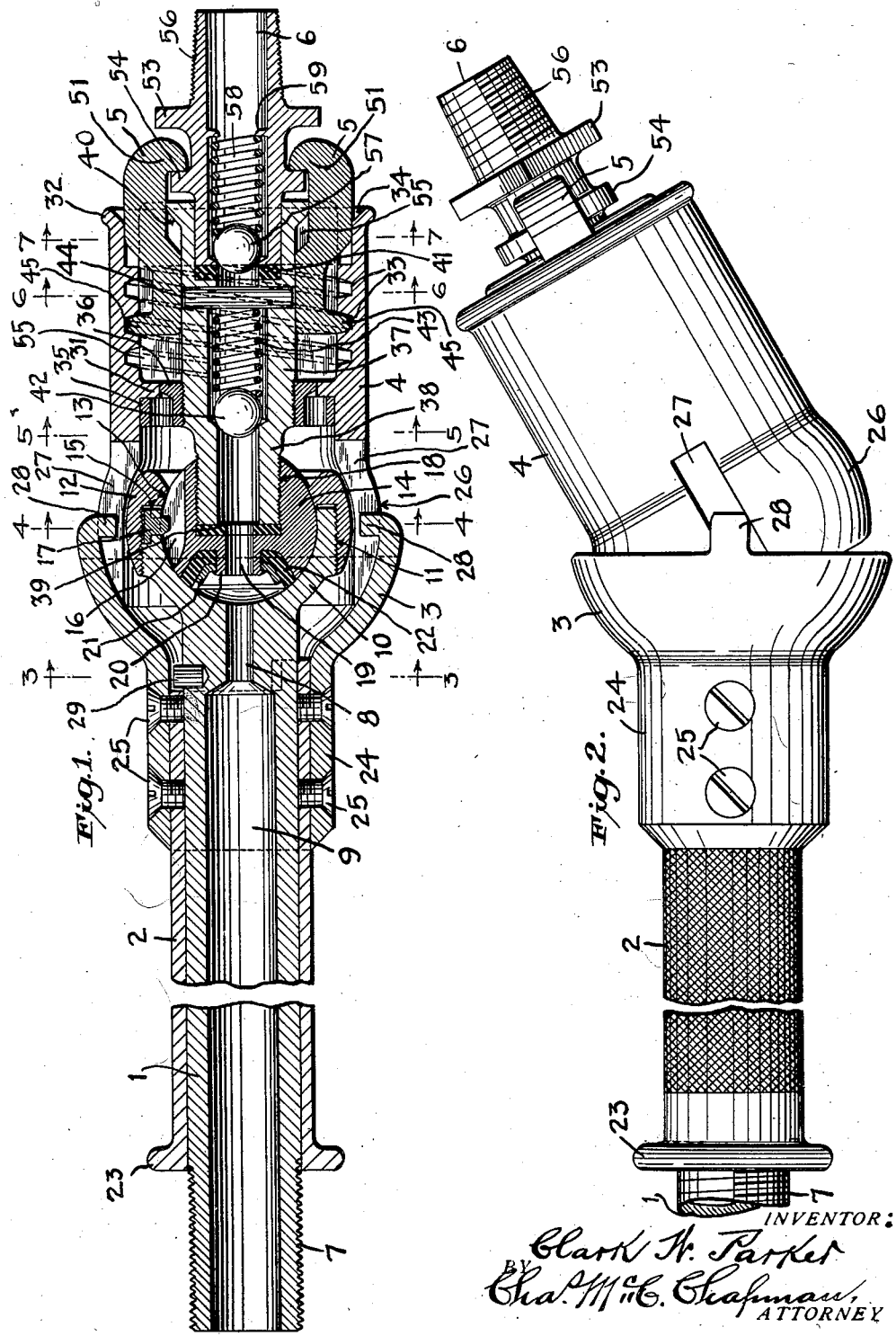
INVENTOR:
Clark W. Parker
BY Chas. M. C. Chapman,
ATTORNEY June 18, 1935. C. W. PARKER 2,005,556

COUPLING MEANS FOR LUBRICATING SYSTEMS

Original Filed Nov. 21, 1923  3 Sheets-Sheet 2

INVENTOR:
Clark W. Parker
BY Chas. M. C. Chapman
ATTORNEY

June 18, 1935.  C. W. PARKER  2,005,556
COUPLING MEANS FOR LUBRICATING SYSTEMS
Original Filed Nov. 21, 1928   3 Sheets-Sheet 3
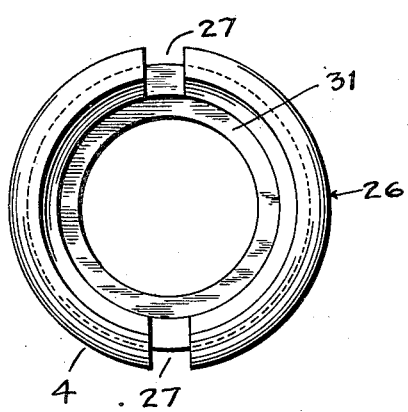
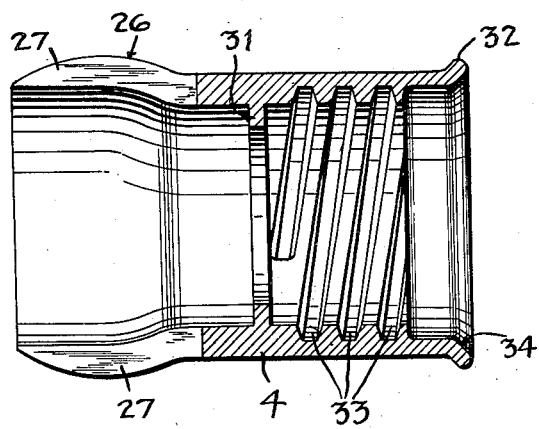
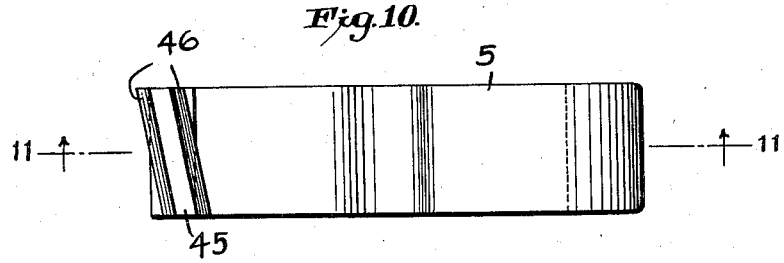
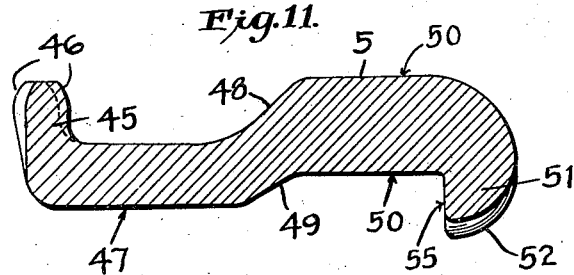
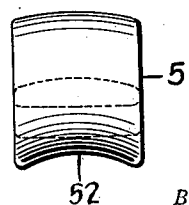

Patented June 18, 1935

2,005,556

UNITED STATES PATENT OFFICE 2,005,556

COUPLING MEANS FOR LUBRICATING SYSTEMS

Clark W. Parker, Brewster, N. Y., assignor, by mesne assignments, to The Lubrication Corporation, South Bend, Ind., a corporation of Delaware Application November 21, 1928, Serial No. 320,832
Renewed June 13, 1932

24 Claims.  (Cl. 285—95)

This invention relates to the art of lubrication, and has particular reference to a coupling means attachable to a grease gun or compressor and to a fitting attached to the machinery to be lubricated, said coupling being capable of conveying the lubricant under any desired pressure from the compressor or grease gun to and through the fitting for lubricating purposes, regardless of the position of the fittings through which the machinery is lubricated, and regardless of the difficulty of approach to said fittings for lubricating purposes.

In the lubricating art, and in connection with modern modes, systems and means for lubricating bearings of road vehicles and industrial machinery, it is a great desideratum to provide a coupling including a conduit which is capable of withstanding or carrying high pressure imposed upon the lubricant without leakage from the conduit or coupling, and without bursting the latter during the process of lubrication; and it is also quite desirable to provide a conduit and coupling means capable of angular adjustments such as to enable them to be approached to fittings which are different of access, and to enable ready coupling by the use of one hand only to such fittings, regardless of where located.

In the light of the development of the lubricating art and the present-day requirements thereof, my invention will be better understood by stating certain objects thereof among which may be noted the following: to provide a conduit and coupling means capable of angular adjustments with reference to the grease gun and the fitting to which the coupling member is to be applied, which will not leak and which will withstand exceedingly high pressure; to provide a conduit, embodying an adjustable coupling, which is strong, durable, dust-proof, and has all its important structural and functional parts covered and incapable of being tampered with, broken in use or fractured or broken or lost by careless handling or treatment thereof; to provide a rigid conduit for use in connection with high pressure grease guns or compressors which embodies a coupling member capable of considerable angular adjustment relatively to said conduit and universally within the limits of the said angular adjustment, and which coupling, regardless of adjustment, can be shifted and manipulated by means carried on the rigid conduit conveniently for manipulation by the operator, thus avoiding the necessity for entering the coupling, and also the hand, or together with the hand, into the practically inaccessible positions or locations occupied by the fitting or closure or grease cup applied to the end of the gland leading to the bearing or parts to be lubricated; to provide a coupling between a high power compressor or grease gun and a fitting or grease cup which can be readily applied to the latter, regardless of where located, by merely manipulating a remote member attached to the coupling, and which coupling embodies a plurality of strong and durable jaws adapted to engage a fitting at any point around the circumference of the latter; to provide a strong, durable and effective coupling between a grease gun and a fitting which eliminates the use of the highly objectionable and easily destroyed bayonet joints, slotted couplers, and interacting pin fittings now in common use; and to provide a conduit embodying a coupling member which, when not in use, covers, houses and protects all the parts of the dual structure, and which, when in use, exposes only a small portion of a plurality of coupling or clamping jaws which are strong, durable and effective for the purposes outlined in the foregoing.

With the above objects in view, my invention consists in the parts, feature, elements and combinations hereinafter described and claimed, and in connection therewith other objects will be detailed during the course of this description.

In order that my invention may be readily understood, I have provided drawings wherein:

Figure 1 is a longitudinal, central sectional view of a structure of conduit and coupling embodying my invention, the figure also showing an improved form of fitting adapted for use in connection with my coupling means;

Figure 2 is a top plan view of the structure shown in Figure 1, showing the coupling member adjusted at an angle to the conduit carrying the same;

Figure 3:
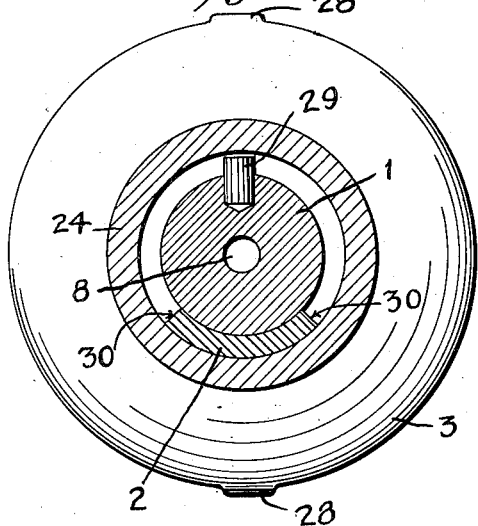
Figure 4:
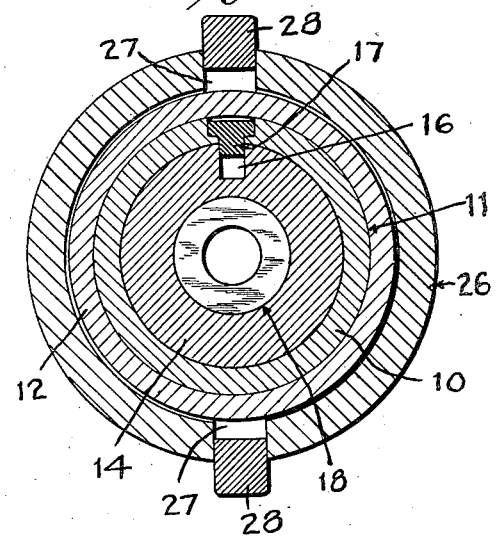
Figure 5:
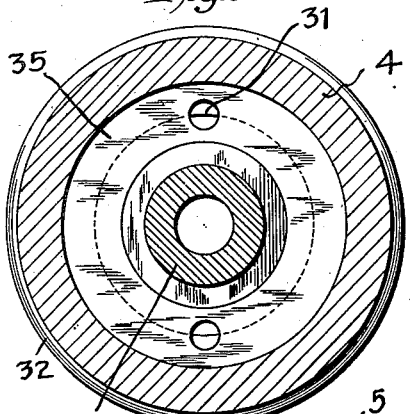
Figure 6:
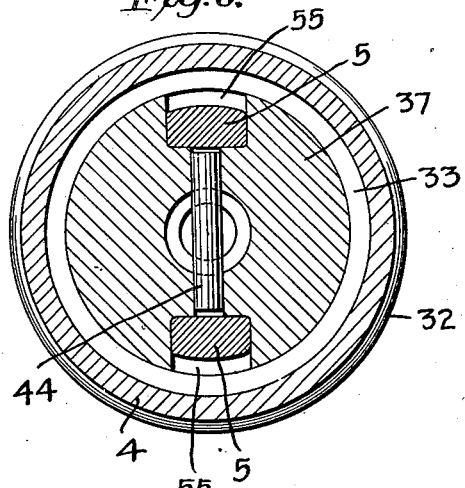
Figure 7:
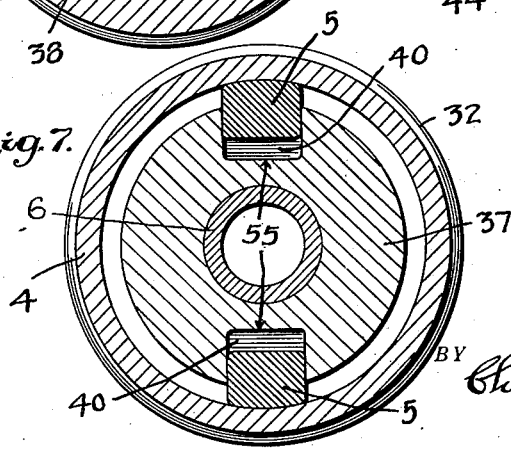

Figures 3, 4, 5, 6 and 7 are cross-sectional views taken, respectively, on the lines 3—3, 4—4, 5—5, 6—6 and 7—7 of Figure 1.

Figure 8 is a view showing the coupling sleeve in longitudinal, central section;

Figure 9 is an end elevation of the coupling sleeve of Figure 8;

Figure 10 is a plan view of one of the clamping jaws;

Figure 11 is a longitudinal, sectional view of the jaws shown in Figure 10; and

Figure 12 is a view in end elevation of the jaw-end of Figure 11.

Referring to the drawings, the numeral I' indicates the hose or primary conduit and supporting member of the rigid conduit forming part of my invention, 2 is the sheath carried by and rotatable on the hose 1, 3 is the actuating member carried by the sheath, 4 is the coupling member, 5 indicates the clamping jaws, and 6 indicates the fitting.

According to my invention, the conduit is rigid, in contradistinction to the common form of flexible braided metal conduits commonly in use, and my conduit is adapted for use in connection with a high power compressor or grease gun such as shown in my pending application Serial Number 272,921, filed April 26, 1928. The inner end of the hose 1 is threaded externally, as at 7, for the purpose of coupling in any suitable manner with a high power grease gun such as shown in my said application. The outer end of the hose 1 is interiorly reduced so as to provide the small passage 8 in continuity with the large passage 9 through the hose; and said outer end of the hose is also enlarged, as at 10, to provide a hollow, semi-spherical member the outer surface of which is flattened to provide a screw-threaded area 11, to which may be applied a holding ring 12 externally curved and internally grooved, as at 13, to provide a curved surface for application to a ball member 14 forming with the enlargement 10 and ring 12 a universal joint permitting movements, as presently described. The ring 12 is shouldered at 15 for cooperation with the angular end of the enlargement 10, and the inner surface of the ring is flattened and threaded so as to be applied to the threaded circumference 11 of the enlargement 10. The said enlargement 10 and the ring 12 constitute a socket for the ball 14, which latter is provided with a longitudinal groove 16 interacting with an angular pin 17 to limit the movement of said ball relatively to the hose 1, the said pin 17 being removably set in a shouldered aperture in the circumference of the enlargement 10 of the hose. When the ring 12 is removed from the enlargement 10, the ball can be withdrawn from the socket in the enlargement 10 and the pin 17 may also be removed. The ball 14 is provided with an internally threaded chamber 18, into which extends a narrowed passage 19 formed in an extension 20 terminating in a chamber in the ball opposite the chamber 18. The extension 20 has its outer end flanged so as to tightly hold a bent metal washer 21, which clamps a flexible gasket 22 adapted to seal the joint between the ball 14 and the socket in the enlargement 10 at the end of the hose.

The sheath 2 surrounds a smooth portion of the hose 1 and has its surface knurled to provide a sufficiently extensive gripping portion to enable the sheath to be turned on the hose 1. The inner end of the sheath may be flanged or enlarged, as at 23, and the outer end thereof has applied thereto the actuating member 3 adapted to shift the coupling member or sleeve 4 circumferentially of the hose enlargement 10. The actuating member is secured by its tubular collar 24 to the outer end of the sheath 2 by a plurality of screws 25, and has a semi-spherical enlargement adapted to receive the hose enlargement 10 and all the parts carried thereby and the bulbous end 26 of the coupling sleeve 4 which is provided with oppositely disposed longitudinal slots 27 terminating at the inner end of said bulbous portion 26. The engagement between the actuating member 3 and the coupling sleeve 4 is provided by inturned lugs or fingers 28 sliding within the slots 27 and tilting upon the walls of the latter as the coupling member or sleeve is shifted relatively to and on the joint produced on the inner end of the hose 1 as described. Thus, when the sheath is located upon the hose 1, the actuating member 3, through the medium of its lugs or fingers 28, will rotate the coupling sleeve 4 on and relatively to the enlargement 10 of the hose. I have provided for a limitation of such rotary movement by setting a stop-pin 29 in the hose adjacent the inner end of the sheath 2, and cutting away the inner end of said sheath so as to provide opposite contact shoulders 30 for engagement of said stop-pin, thus preventing the sheath and its actuating member 3 from turning in either direction beyond said shoulders 30 or beyond the pin 29, see Figure 3.

Details of the coupling sleeve are shown in Figures 1 and 5 to 9, inclusive, including the parts carried thereby, which enable it to be coupled to the hose 1 and actuated by the member 3 of the sheath 2. Therein it will be seen that the coupling sleeve 4, as previously noted, is provided with longitudinal slots 27 in the bulbous inner end member 26, the inner surface of the said bulbous member being curved sufficiently to enable it to slide freely on and about the ring 12 of the hose enlargement 10. The inner surface of the sleeve 4 is provided with a flange 31, and between said flange and its outer flared end 32 said sleeve is provided with an internal spiral thread 33 constituting a high speed screw. The flared end provides also an interior cam surface 34, the function of which will be presently noted. Cooperating with the flange 31 is a collar 35 which snugly fits the inner surface of the flange and has a reduced flanged ring member 36 which engages the inner circumference of the flange, the said ring member being internally threaded for engagement with the threaded surface of the socket conduit 37 centrally located in the coupling sleeve and provided at its inner end with a reduced extension 38 externally threaded and turned into the chamber 18 of the ball 14, a gasket 39 being held in said chamber 18 tightly against the end of the reduced extension 38, thus making a seal between the parts. The outer end of the socket conduit is expanded to provide a camming flange 40 located concentrically within the cam surface 34 of the flange 32 of the sleeve 4, and said outer end of the socket conduit 37 is provided with an enlarged chamber in the bottom of which is set a sealing gasket 41. Between the inner wall of the said chamber and the inner end of the socket conduit, a smaller chamber is provided for a ball valve 42 suitably seated in said chamber at the end thereof, and normally held seated by the spring 43 at rest upon a transverse pin 44 extending across the valve chamber and at rest in apertures in the walls of the conduit. Thus the valve is normally held seated; but, will yield under sufficient pressure to overcome the spring 43 imposed by the column of grease forced through the conduit 9, passage 8, passage 19 and the conduit 37. Located between the circumference of the socket conduit 37 and the inner circumference of the coupling sleeve or coupler 4 at the screw-threads are the clamping jaws 5, any suitable number of which may be provided. I prefer to employ only two sufficiently extensive and sturdy clamping jaws, as I have found that they operate accurately and effectively as coupling members. The details of these clamping jaws are shown in Figures 10, 11 and 12, and therein it will be seen that the inner end of each of said jaws is turned at a right-angle to provide track members 45 adapted to travel in the screw-threads 33 of the coupler 4, said track members being arranged at an angle to the body of the clamping jaws corresponding to the angle or pitch of the screw-threads 33, thus avoiding binding within the screw-threads. The track members 45 are also provided with rounded surfaces 46 to minimize friction within the threads 33, and also to enable the clamping jaws to have a limited pivotal movement within said tracks. The inner surface 47 of each of the jaws 5 is flattened to engage the circumference of the socket conduit 37 and lie snugly thereagainst and parallel therewith; and on opposite sides of the jaws cam surfaces 48 and 49 are provided, respectively adapted to engage the cam 34 of the coupling member 4 and the cam 40 of the socket conduit 37. Between the cam surfaces 48 and 49, and the hooked end of the jaws, the opposite surfaces of the jaws are flattened, as indicated at 50, for the purpose of riding against the inner wall of the member 4 and the extremity of the cam surface 40, respectively. The hooked end 51 of each of the jaws is inturned oppositely to the track member 45, and said hooked end is transversely curved, as at 52, for the purpose of engaging snugly the circumference of the fitting 6 between its outer flange 53 and its inner flange 54; and the inner surface 55 of the hooked end 51 of the jaw is flattened so as to intimately engage the outer surface of the flange 54 of said fitting. Thus, oppositely disposed clamping jaws in the coupling member will surround a goodly portion of the circumference of the fitting between the two flanges, and will also snugly fit a goodly surface of the flange 54 of said fitting. The outer end of the fitting is threaded, as at 56, to enable it to be screwed into the tapped end of the entrance to the gland leading to the bearing to be lubricated; and the inner end of the fitting is internally flanged and provided with a seat for the ball-valve 57 normally held against the seat by the expansion spring 58 at rest at its opposite end on the internal lugs 59 of the fitting. Thus, the fitting is normally sealed against admission of dust, grit or other foreign substances, its flattened end is adapted to snugly fit against the gasket 41 in the socket of the conduit 37 and its circumference between its valved end and its flange 54, which is quite extensive, snugly fits within the socket of the conduit 37. Also, the flange 53 of the fitting is made angular so as to adapt it for engagement with a wrench for the purpose of firmly securing it in place at the end of the lubricating gland. This fitting is, in effect, a small grease cup and is intended to be sufficiently large and have a sufficiently large passage therethrough to enable it to contain a goodly supply of lubricant such as grease as usually employed.

It will also be seen that the passage through the conduit 37 is automatically and normally sealed against either the admission of grit, dirt or other foreign substance, or the passage of grease when the hose and coupler are not in use or the grease therein is not under pressure.

From the foregoing description, the following mode of operation will be readily understood:

My hose or conduit and coupler are adapted to be applied to any form of grease gun, regardless of whether it be high pressure or low pressure or for use by owners of cars, or for use in garages or service stations, and in using the conduit and coupler it is directed by hand to the fitting or grease cup which is to be supplied or through which the supply is to be forced. Due to the form of the clamping jaws, a fitting is employed having the circumferential engaging flange 54 continuous and without break. This gives the clamping jaws a substantial grip or hold upon the fitting. Additionally, the fitting is provided with an extended body or neck beyond the flange 54, at the end of which the ball 57 is seated, and within which the spring 58 is housed. Therefore, the socket of the conduit 37 is commensurately deep, and at the bottom thereof the gasket 41 is confined and is engaged by the end of the fitting. The said gasket is preferably composed of a comparatively soft material which will compress to a slight extent, and during compression will expand radially into engagement with the walls of the socket so as to seal the junction between the socket and the fitting. Compression of the gasket within the socket by the fitting is brought about by the engagement of the clamping jaws with the flange 54 of the fitting, when the latter has been inserted in the said socket, the clamping jaws being retracted, after being closed upon the flange within the coupler, by the interaction of the spiral grooves 33 and the track members 46, when the coupler is turned by the member 3 of the sheath through the medium of the prongs 28 acting upon the walls of the slots 27 in the coupler. Thus, the coupling member is securely applied to the fitting, and the fitting is vigorously forced within the socket of the conduit 37 and there held until the lubricating process has been completed.

With the hose applied to a compressor, the coupler can be universally adjusted circularly relatively to the sheath member 3 to the extent permitted by the travel of the ball 14 within the hose socket 10. Such adjustments may vary from alinement of the coupler with the hose and sheath, as shown in Figure 1, to any circular position at an angle of approximately 30° between the parts, as shown in Figure 2. This angular adjustment which is frictionally maintained, whatever it may be, enables the coupling member to be approached in approximately a straight line to the fitting, regardless of the position of the latter on the machinery to be lubricated or the inaccessibility of such fittings as sometimes found on industrial machinery and on road vehicles. An important feature of my invention is that the coupler can be set at an angle to the hose and sheath members and frictionally held as thus set during all subsequent operations of lubrication. This is due to the fact that the ball 14 is frictionally held in the socket members 10 and 12 tightly as desired by adjusting the latter upon the ball and relatively to the member 10. Moreover, the tight fit between the socket member 10 and the gasket 22 increases the friction between the ball and socket member so that the coupler, when set at the proper angle, tends to remain there under ordinary conditions of use. The limitations imposed upon the movements of the ball 14 within the socket member 10 by the engagement of the pin 17 with the end wall of the slot 16 of said ball prevent the gasket 22 from being shifted beyond the passage 8 through the socket member 10, thus enabling the stream of lubricant to continue its passage through the coupling member to the fitting, regardless of the angular relation of the members 3 and 4. The connection of the conduit 37 to the ball 14, and to the flange 31 of the coupling member prevents the latter from being separated from the actuating member 3 of the sheath, regardless of the angular relation of the latter and the coupler. When the sheath is rotated upon the hose, the prongs 28 of the actuating member 3 transmit motion to the coupler 4, thus causing the clamping jaws 5 to travel outwardly or inwardly according to their original position and the direction of rotation of said sheath. The rotation of the coupler thus brought about, when employed for coupling purposes, will cause the clamping jaws to slide outwardly from the coupler and simultaneously open or spread by pivoting, through the medium of their track members 46, against the walls of the spiral groove or tracks 33, and by engagement of the cam 49 of the clamping jaws against the cam 40 of the socket conduit, and, simultaneously, the cams 48 will slide over without being influenced by the cam 34, which latter offers no impediment to the outward movement or opening movement of said jaws. When the hook ends 51 of the jaws have been entered into the circumferential groove between the flanges 53 and 54 of the fitting, a reverse movement of the sheath will cause its driving member to reversely move the coupler, thus causing the track members of the clamping jaws to reversely travel in the tracks 33 of the coupler, and withdraw within the flange 32 of the coupler and simultaneously be shifted toward each other by the action of the cam 34 upon the cam 48, which forces the hooked end of the jaws into firm gripping contact with the outer surface of the flange 54. The continued withdrawal of the clamping jaws within the coupler 4 forces the barrel of the fitting, at its valved end, snugly into the socket of the conduit member and against the gasket 41, thus compressing the latter, sealing the connection between the fitting and the conduit and firmly establishing the connection between the clamping jaws and the fitting. With the parts thus related, as shown in Figure 1, the compressor can be operated to force the lubricant through the passage 9 of the hose 1, through the passage 8 and into the chamber of the socket member 10, through the passage 19 of the ball-joint 14, and through the socket conduit unseating the valve 42 thereof against the pressure of the spring 43, around the pin 44 on which the spring is seated, and past the ball-valve 57 in the fitting 6 by unseating said valve against the pressure of spring 58, the lubricant thence passing freely and without retardation through the gland to the bearing to be lubricated.

It will be seen that all the parts of my angularly adjustable coupling member are strong, durable, simple and economical to produce, and that they operate positively to engage the fitting which is so constructed as to present a gripping surface at all times to the clamping jaws, regardless of where the fitting may be or the angular relation of the coupling member to the conduit and its actuating parts. It will also be seen that, when the clamping jaws are withdrawn within the coupler, they cannot be readily fractured, and that the coupler itself, together with the driving member 3, is so strong, composite and the parts are so compact that they cannot be cracked or broken or fractured by any rough usage to which they may be subjected in use in and around the garages or service stations. The hose and sheath are made of any desired length and, proportionally, the coupling member is short, stocky and sturdy.

It is to be noted that my conduit and coupler made the subject of this application are particularly intended for use in connection with my high pressure grease gun made the subject of my application filed of even date herewith. In the push-rod form of my grease gun, I have produced a compressor which is capable of exerting, in connection with my hose and coupling shown herein, five thousand pounds pressure upon the column of grease supplied to the fitting. With the compound lever form disclosed in my said concurrent application, coupled with the conduit and coupling of my present application, such pressure can be approximately doubled without the increase of energy beyond what is required for operating a push-rod form. In both instances, the mechanism of my grease gun, in addition to the automatic feed thereof, constitutes a booster, and when used in connection with my hose and coupling of this application, the lubricant is freely fed to the bearings. In fact, the passage through my present hose and coupling is exceedingly large, and with the form of fitting which I have devised to accompany the same, there is little or no retardation in the passage of lubricant, and the fitting does not become jammed because the grit and sand and other foreign substances cannot accumulate within the chamber of the fitting in a manner to either clog the latter or constitute an impediment to the free passage of the lubricant.

By imposing a limitation upon the movement of the actuator 3 in opposite directions, the coupler is prevented from acting upon the clamping jaws 5 to such an extent as to drive them so far beyond the flared end 32 as to either cause them to drop out of the coupler or lose engagement with the internal spiral thread 33. This is important, since the sheath cannot be indefinitely rotated on the hose or conduit 1 and the clamping jaws will be always maintained within the coupler and in functional engagement therewith.

It is an important feature of my invention to provide a close fit between the valved end of the fitting 6 and the socket in the conduit 37; for, by extending the body portion or valved end of the fitting 6 and providing the commensurate socket therefor in the conduit 37, it is possible to guide the coupling directly along the fitting as a preliminary to obtaining a gripping engagement between the clamping jaws 5 and the flange 54 of the fitting. Furthermore, the hooked ends 51 of the clamping jaws can thus be made to simultaneously engage the flange 54 for clamping action, thus making certain the coupling action as the coupler is advanced to and along the extended body of the fitting. By this construction, the fitting is made to provide a guide for the coupling member so that the latter can accurately advance along the fitting to the flange 54, and then upon rotation of the sheath the clamping jaws can be made to accurately engage the flange; and no angular or tilting action can be brought about between the clamping jaws and said flange. Upon viewing Figure 7 of the drawings, it will be seen that the clamping jaws slide in and are guided by oppositely disposed slots 55 in the socket conduit, which slots extend longitudinally thereof and prevent the clamping jaws from having any sidewise or twisting action under the impulse of the tracks 33. This enables the hooked members 51 of the clamping jaws to engage the flange 54 of the fitting uniformly, accurately and firmly as the sheath is rotated to withdraw the clamps within the coupler.

Having thus described my invention, what I claim and desire to secure by Letters Patent is:

1. A coupling member for high pressure grease guns comprising, a hose, a rotary sheath carried thereby having an actuator, a coupler, means connecting the coupler with the hose, means connecting the coupler with the actuator for shifting the coupler, and clamping members carried by the coupler and adapted to grip a fitting.

2. A coupling member for high pressure grease guns comprising, a conduit having a socket at its outer end, a cylindrical coupler having a bulbous portion surrounding the socket, means connecting the socket and the coupler, means for rotating the coupler on and relatively to the socket, and means whereby the coupler may have universal movement on and relatively to the socket.

3. A connection between a high pressure grease gun and a fitting comprising, a conduit having a socket, a sheath mounted on the conduit and having an actuator, a coupler universally jointed to the socket, and having means interacting with the actuator, whereby the coupler may be rotated relatively to the socket.

4. A connection between a high pressure grease gun and a fitting, comprising, a conduit, a coupler, a universal joint between the conduit and coupler, means carried by the conduit for rotating the coupler, and relatively movable means carried by the coupler for gripping the fitting.

5. A coupler for high pressure grease guns comprising, a conduit, a cylindrical member, a universal joint connecting the member with the conduit, and a sheath mounted on the conduit having means for engagement with the member to rotate the same relatively to the universal joint.

6. A connection between a high pressure grease gun and a fitting comprising, a conduit, a cylindrical member universally jointed to the conduit, means between the conduit and the member for rotating the latter, and clamping jaws carried by the member for engaging the fitting.

7. A connection between a high pressure grease gun and a fitting comprising, a conduit, a rotary sheath mounted thereon, a cylindrical member universally jointed to the conduit, a slidable connection between the sheath and said member whereby the latter may be rotated on and relatively to the universal joint, and gripping means carried by the said member.

8. In combination with a fitting having a circumferential flange and an extended valved body, a coupler having a socket conduit mounted therein and having a socket at one end and a valve near the other end, the socket being adapted to receive the extended body of the fitting, and a plurality of hooked jaws carried by the coupler and movable angularly relatively to the latter for engaging the flange of the fitting.

9. A connection for high pressure grease guns comprising, a conduit and a coupler, a universal joint between the two, and means carried by the conduit for actuating the coupler regardless of the angle at which the latter may be relative to the conduit.

10. A connection for high pressure grease guns comprising, a conduit and a coupler, a universal joint between the two, and means between the conduit and the coupler for rotating the latter regardless of the angle at which the latter may be relative to the conduit.

11. A connection for high pressure grease guns comprising, a conduit, a sheath rotatably mounted upon the conduit, a universal joint between the sheath and the conduit, a coupling member connected to the universal joint and interacting with the sheath to be rotated by the latter and to have universal movement relatively to the sheath, and a plurality of gripping jaws carried by the coupling member and adapted to be reciprocated thereby and oscillated thereon.

12. A connection between a high pressure grease gun and a fitting comprising, a conduit having an enlarged socket member, a cylindrical coupling having a universal joint connection with the said member, means between the conduit and the coupling for rotating the latter, and pivotally mounted clamping jaws carried by the coupling.

13. A coupler for high pressure grease guns comprising, a cylindrical member having a spiral track the base of which is rounded, and a plurality of clamping jaws having their inner end correspondingly rounded and adapted to travel in the said spiral track, a conduit and means connecting the same to the said cylindrical member, and means carried by the conduit for rotating the member relatively to the conduit whereby the jaws are caused to pivot on the member and move in a right-line relatively thereto.

14. In combination with a fitting having a circumferential flange and an extended body portion carrying at its inner end a yieldable valve, a coupler having a socketed conduit rigidly mounted therein and adapted to receive the extended body portion of the fitting, and having means outstanding therefrom for engaging gripping jaws, a plurality of gripping jaws carried by the coupler and having hooks at their outer ends for engaging the flange of the fitting, means for engaging the coupler and the socketed conduit for actuating the gripping jaws, a conduit to which the coupler is connected, and means carried by the conduit for actuating the coupler.

15. A connection between a high pressure grease gun and a fitting comprising, a conduit, a sleeve confined to rotation thereon, a coupling member mounted on the end of the conduit, clamping paws carried by the said member, means between the sleeve and member for rotating the latter, and means between the member and the jaws for causing the latter to travel outwardly and laterally relatively to the member to engage and grip a fitting.

16. A connection such as defined in claim 15 wherein a universal joint is provided between the end of the conduit and the coupling member, whereby the latter may have universal movement on the conduit and yet be rotated by the sleeve.

17. A coupler for high pressure grease guns comprising, a conduit, a cylindrical member, a universal joint between the conduit and the member, a plurality of clamping jaws carried by the coupler, and means between the jaws and the coupler whereby the jaws may be given right-line reciprocations within and relatively to the coupler and oscillatory movements within and relatively to the coupler.

18. A lubricant discharge nozzle for servicing a lubricant receiving fitting comprising, a conduit adapted for connection with a source of lubricant supply, a casing fixed against longitudinal movement relative to said conduit, a plurality of rigid clamping jaws disposed within said casing for engagement with said fitting, the inner and opposed walls of the jaws receding inwardly rearwardly of the outer ends of the jaws and each provided with surfaces engaged with adjacent guide surfaces formed on the inner wall of said casing, and means for producing relative movement between said jaws collectively and said casing whereby the jaws may be forced radially toward and into clamping engagement with said fitting through the medium of said guide surfaces on said casing clampingly to engage said fitting.

19. A connector for pressure lubricators comprising a conduit adapted for connection with a source of lubricant supply, a casing fixed against longitudinal movement relative to said conduit and terminating at its outer end in a camming surface, a member coaxially mounted with respect to said casing, rigid clamping jaws mounted in secure but unfastened relationship between said member and said casing for radial swinging movements and having a portion adapted to engage said camming surface, said jaws being adapted to be moved longitudinally relative to the axis of said casing and relative to said conduit to engage said portion with said camming surface for forcing said jaws to swing bodily about a pivot point to bring their outer ends radially toward and into clamping engagement with a fitting, and sealing means carried by said member against which the fitting is adapted to press when held by said clamping jaws.

20. A lubricant discharge nozzle and coupler for servicing a lubricant receiving fitting comprising, a conduit adapted for connection with a source of lubricant supply, a casing fixed against longitudinal movement relative to said conduit, cam guide surfaces formed on the inner wall of said casing at the outer end thereof, a plurality of rigid and inflexible clamp jaws mounted in unfastened but confined relationship within said casing for bodily swinging movements whereby their outer ends may be moved radially into and out of engagement with said fitting when the fitting is disposed within the jaws, said jaws being provided with cam surfaces engageable with said cam guide surfaces formed on the inner wall of said casing, and means for producing relative movements between said jaws collectively and said casing and said conduit whereby the outer ends of the jaws may be forced radially toward and into clamping engagement with said fitting through the medium of said guide surfaces, whereby clampingly to engage said fitting.

21. A lubricant discharge nozzle and coupler for servicing a lubricant receiving fitting comprising, a conduit adapted for connection with a source of lubricant supply, a casing fixed against longitudinal movement relative to said conduit, a plurality of rigid and inflexible clamping jaws arranged in unfastened but confined relationship annularly about the interior of said casing and mounted adjacent their inner ends within said casing for bodily swinging movements of their outer ends radially of the casing for engagement with said fitting, said clamping jaws and said casing having cooperative camming surfaces formed thereon toward their outer ends, and means for producing relative longitudinal movement between said jaws collectively and said casing and said conduit whereby the jaws may be forced radially toward and into clamping engagement with said fitting through the medium of said camming surfaces whereby clampingly to engage said fitting.

22. A coupler for pressure lubricators comprising, a conduit adapted for connection with a source of lubricant supply, a casing fixed against longitudinal movement relative to said conduit and terminating at its outer end in a camming surface, a tubular member co-axially mounted with respect to said casing and within the confines of the casing, a plurality of rigid clamping jaws independently retained in annular array and at relatively fixed distances apart from one another between adjacent surfaces of said casing and said member, said jaws being in unfastened relationship with respect to said casing and said member and capable of collective bodily shifting upon movement thereof relative to the camming surface of the casing, thereby to cause the jaws to move into clamping engagement with a fitting, means forming a lubricant connection between said conduit and said inner member, and sealing means carried by said inner member against which the fitting is adapted to press when held by said clamping jaws.

23. A coupler for servicing pressure fed lubricant receiving fittings comprising, a conduit adapted for connection to a source of lubricant supply, a casing fixed against longitudinal movement relative to said conduit, a core having a passageway extending longitudinally therethrough located within said casing substantially along the longitudinal axis thereof and cooperating with the casing to provide a space therebetween adjacent to the outer end of the casing, fitting engaging sealing means on said core surrounding the discharge orifice of said passageway, means including a packing gasket establishing a lubricant-tight seal between said conduit and the inlet of said passageway, and means operable, upon relative movement between said casing and said core, clampingly to engage a fitting when said fitting is in register with said sealing means, said clamping means including a plurality of rigid fitting engaging jaws located within said space between said casing and said core and freely engaging the outer wall of the core, a cam surface on the inner wall of said casiing at the outer end thereof and fitting engaging portions formed at the outer ends of said jaws.

24. A connector for pressure fed lubricant fittings comprising, a conduit adapted at one end for connection with a source of lubricant supply, a lubricant conducting member associated with the other end of said conduit, said conducting member having a lubricant passageway therethrough for the passage of lubricant from the conduit to a fitting, a casing member surrounding said conducting member and spaced from said conducting member at the outer end of said conducting member, said casing member being secured against longitudinal movements relative to said conduit member, a plurality of fitting engaging jaws disposed in annular and unfastened array in the space provided between said casing and conducting members, said jaws and one of said members having interengaging means for retaininig the jaws against displacement from said space, a cam surface formed on the outer portion of said casing member, and a cam surface formed on each of said jaws for engagement with the cam surface on said casing member whereby to force said jaws into clamping engagement with a fitting upon relative movements in one direction between said cam surfaces.

CLARK W. PARKER.